Oct. 22, 1935.  E. H. FAHRNEY  2,018,015
METER READING CAMERA
Original Filed April 14, 1933   2 Sheets-Sheet 1
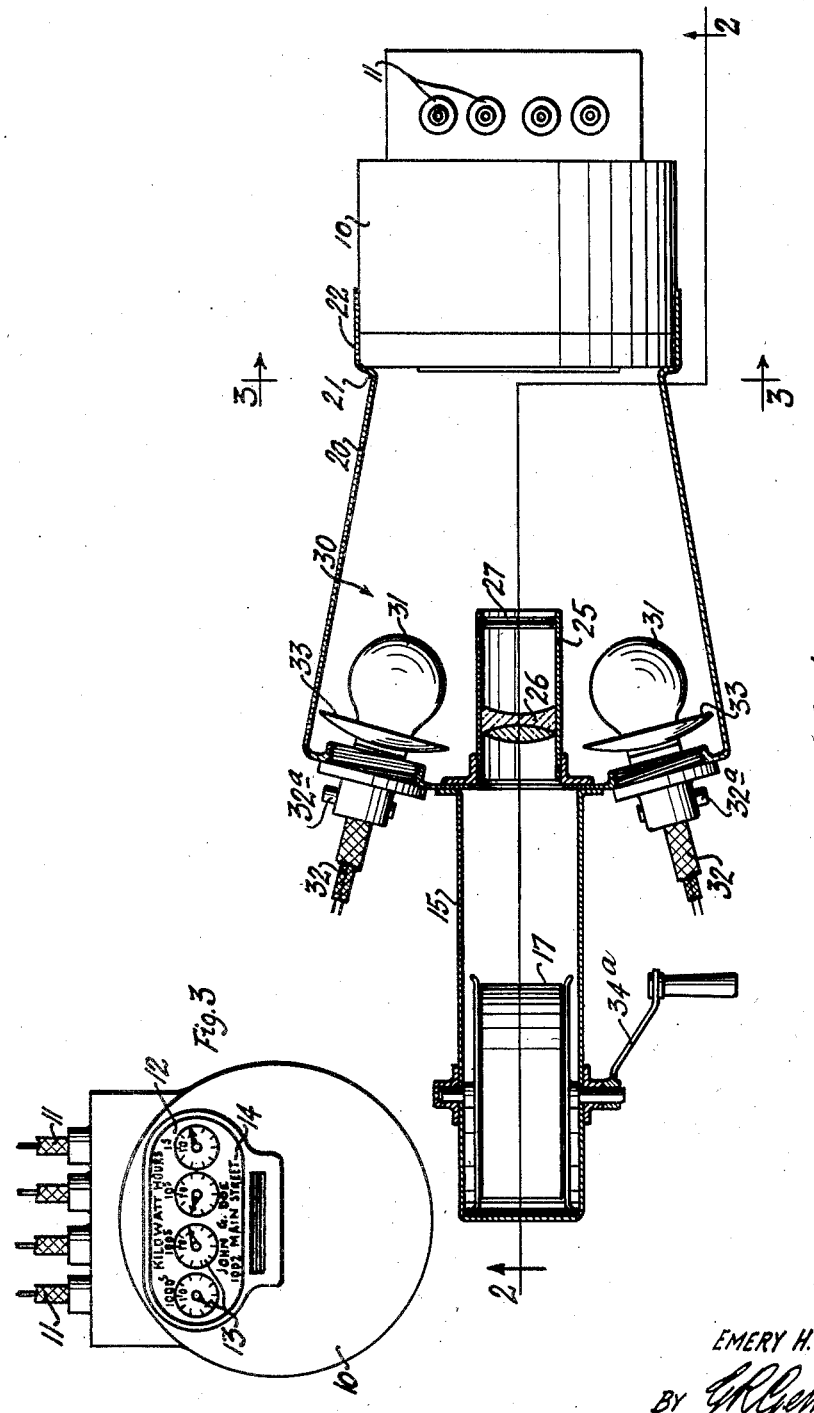
Inventor
EMERY H. FAHRNEY
By GRGehrandt
Attorney Oct. 22, 1935.   E. H. FAHRNEY   2,018,015
METER READING CAMERA
Original Filed April 14, 1933   2 Sheets-Sheet 2
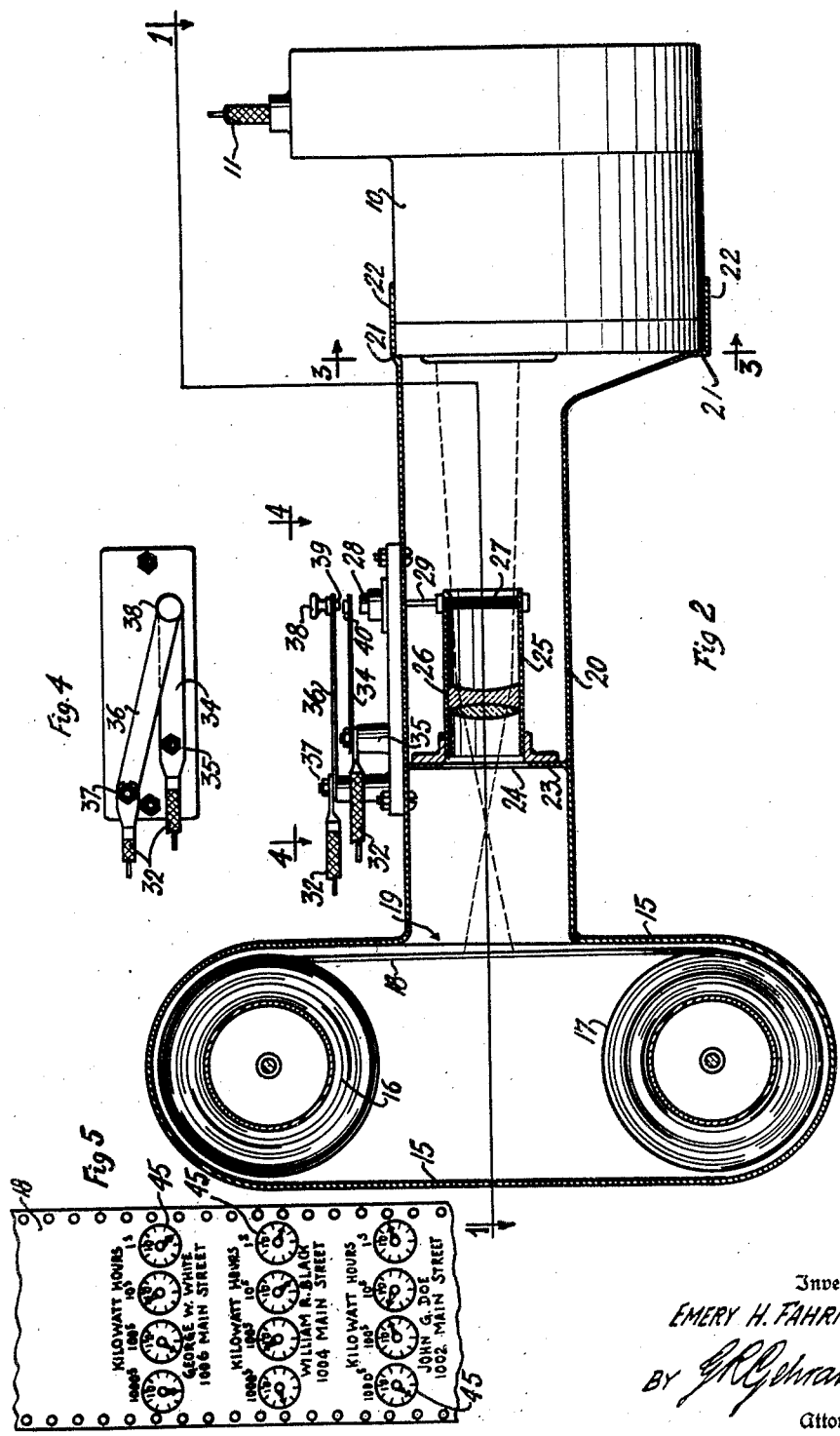
Inventor
EMERY H. FAHRNEY
By G. R. Gehrands
Attorney Patented Oct. 22, 1935

2,018,015

UNITED STATES PATENT OFFICE 2,018,015

METER READING CAMERA

Emery H. Fahrney, Oak Park, Ill.

Original application April 14, 1933, Serial No. 666,109. Divided and this application March 3, 1934, Serial No. 713,801

11 Claims. (Cl. 95—34)

This application is a division of original application, Serial No. 666,109, filed April 14, 1933.

This invention relates in general to an improved method of producing the readings of meters, such as are used for measuring or metering gas, water or electricity, although the same may be employed for various other purposes.

The usual method now employed for producing such records is to provide a number of "meter readers" who make a house to house inspection of the meters and then enter the readings in books or on sheets provided for that purpose.

However, when access cannot be readily had to the meters, the "meter reader" in order to save himself another trip to such premises or meters, will frequently guess at the readings and so enter the same in the books or on the sheets.

The books or sheets are then turned into the office and transfers therefrom are made upon the customer's or consumer's bill. This is quite an arduous task and frequently results in mistakes and is in many instances by no means accurate.

It is one of the objects of the present invention to provide an improved meter reading camera by means of which such meter readings may be obtained by making an exact reproduction of the face or dials of the meter.

The reading is obtained by producing a negative from which the reproduction may be printed or transferred directly upon the customer's or consumer's bill by photographing the same upon a sensitized or specially prepared surface on the bill itself.

Obviously, any other data may be provided on the face of the meter, such as the name and address of the customer which will also be transferred to his bill, thereby materially reducing the labor, expense and time heretofore necessary in preparing the bills for distribution to the customers and consumers, and at the same time insuring an accurate reading of the meter.

With this improved method it will be manifest that no mistakes in the meter readings will occur and an accurate check will be kept upon the "meter reader" as it will be absolutely necessary for him to visit the premises upon which the meter is installed and to see each and every one of the meters to obtain photographic reproductions of the dial or face thereof.

In the accompanying drawings there is shown a suitable apparatus for carrying this invention into operation and in which drawings Figure 1 is a horizontal sectional view of an apparatus of this character constructed in accordance with the principles of this invention and as taken on line 1—1, Figure 2, showing a photographing apparatus placed in position upon a meter.

Figure 2 is a vertical, sectional view as taken on line 2—2, Figure 1.

Figure 3 is a front elevation of the face of a meter which is to be reproduced.

Figure 4 is a detail plan view taken on line 4—4, Figure 2.

Figure 5 is a view of a portion of a film upon which reproduction of the meter face is produced.

Referring more particularly to the drawings the numeral 10 designates generally a meter, here shown diagrammatically as an electric meter, into which the service lines 11 lead, and the face 12 of which meter it is desired to read.

The meter face discloses the ordinary dials 13 and may, in addition thereto, contain the name and address 14 of the owner, located in any suitable position, preferably in close proximity to the dials 13, so that when a reproduction of the dial is procured the name and address will also be procured.

The apparatus consists essentially of a casing 15 of any desired size and configuration and in which casing spools or reels 16—17 are arranged, and from one of which reels a film 18 is adapted to be wound upon the other reel. The film as it passes from one reel to the other passes across an opening 19 in the casing 15, and to which opening a tubular extension 20 is secured. This extension may be of any suitable length and diameter and the free end thereof is shaped to form a circumferential shoulder 21 to provide a portion 22 adapted to be telescoped over the front of the meter 10 and when in this position, the casing 15 may be supported by the hand of the operator.

Within the extension 20 is a partition 23 suitably located and provided with an opening 24. Supported by the partition 23 is another tubular casing 25 of an external diameter considerably less than the internal diameter of the tubular extension 20, and within this casing 25 is arranged a photographic lens 26, so arranged that light rays passing therethrough will be directed against the sensitized surface of the film 18.

A shutter 27 is provided for the casing 25 and a plunger or operating device 28 arranged outside of the extension 20 is provided so as to operate through the medium of a connection 29, when the plunger is depressed, to actuate the shutter 27.

Arranged also within the portion 30 of the tubular extension 20 and which portion is preferably enlarged, are lights 31, any number of which may be provided, and which receive current through conductors 32, from any suitable source of supply.

Suitable switches 32ª may be provided to control the lamps 31. Each of the lights or lamps is preferably provided with a reflector 33, and the lamps are arranged in such position with respect to the casing 25 and lens 26 as to supply the necessary light for photographic purposes.

Obviously, the reels 16 and 17 may be rotated by means of a suitable crank or handle 34ª.

The circuit to the lights 31 may be controlled by a suitable switch mechanism which embodies a resilient contact member 34 supported by means of a suitable post 35, and to which switch device one end of the conductor 32 is connected. The free extremity of the switch member 34 is disposed above and normally out of contact with the plunger 28. Another resilient member 36 is supported by one end as at 37, and to which switch element the other conductor of the lamps 31 is connected. The free end of the switch member 36 extends over the switch member 34 and an operating handle or button 38 is secured to the switch member 36. A contact point 39 is carried by the switch member 36, and a contact point 40 is carried by the switch member 34, the contact points 39—40 being normally out of engagement with each other.

With this construction it will be manifest that when the button or handle 39 is depressed, the contacts 39—40 will be brought into engagement and the circuit through the lights will be closed, and a further depression of the handle or button 38 will force the free end of the switch member 34 into engagement with the plunger 28 to depress the latter and thereby operate the shutter 27.

Obviously, the inherent resiliency of the switch members 34 and 36 will permit of such action. When the handle or button 38 is released, the plunger 28 will first rise to close the shutter 27 by reason of the switch member 34 moving out of engagement with the plunger and subsequently the switch member 36 will move out of contact with the switch member 34, and the circuit through the lights will be interrupted.

In operation, the film 18 is placed in the casing 15 on one of the reels 16—17, through a suitable opening (not shown), and the apparatus is then placed upon the face of the meter 10 by telescoping the extremity 22 over the edge of the meter until the shouldered portion 31 abuts the front face of the meter. The operator, if the film is not already adjusted moves the film, or a portion thereof from one of the reels to the other so that a sensitized portion of the film will be within the field of action of the lens 26. By then holding the apparatus in position and depressing the knob or button 38 to close the circuit through the conductors 32 and lamps 31, the lamps will be lighted. A further depression of the knob or handle 38 will cause the switch member 34 to be depressed against the end of the plunger 28 to depress it, and thereby operate or open the shutter 27. This will permit a reproduction or photographic copy of the face 12 and dials 13 of the meter, together with the address 14, to be transferred on to the film 18, as shown in Figure 5. After this photographic copy has been obtained, and after the shutter 27 has been closed and the lights 31 extinguished, the apparatus may be removed from the meter and the film advanced to present another unexposed sensitized portion in the field of action of the lens 26.

This operation may be repeated until the entire film 18 has been consumed. The film may then be developed in the ordinary and usual manner, with the result that the film will appear as shown in Figure 5, with successive photographic copies thereon of the readings of different meters.

After the film has been developed it may be used for the reproduction directly upon the consumers' bills, of the portions of the face of the meters of the respective consumers.

It will be manifest that the films upon which photographic reproductions of the faces of the meter have been obtained and from which films the bills are prepared, will constitute a permanent record and being in the form of a film and wound upon a reel or spool, it will be manifest that a minimum amount of storage space will be necessary.

While the preferred form of apparatus for carrying this invention into operation, has been herein shown and described, it is to be understood that various changes may be made in the details of construction and in the combination and arrangement of the several parts, within the scope of the claims, without departing from the spirit of this invention.

What is claimed as new is:—

1. A portable hand apparatus for photographically reproducing readings of a metered service meter embodying a casing, means within the case for holding a film roll, a portion of the casing telescoping with the meter for supporting the apparatus adjacent the meter face, means for photographing the meter face upon said film, and means for controlling the movement of the film.

2. An apparatus for photographing the dial face of a metered service meter which consists of a casing, spaced film reels therein, one of said reels receiving the film from the other, a tubular extension on the casing, said extension being open at one end and adapted to telescope over the meter face and to serve as a closure for the space between the casing and meter and also to assist in supporting the apparatus, a photographing lens in said extension and in alinement with the portion of the meter to be transferred to the film, a lamp in said casing, and means for controlling the lamp.

3. An apparatus for photographing the dial face of a metered service meter, which consists of a casing, spaced film reels therein, one of said reels receiving the film from the other, a tubular extension on the casing, said extension being open at one end and adapted to telescope over the meter face a circumferential shoulder on the casing wall spaced from the edge of the open end to limit the extent of telescope of the parts, a photographing lens in said extension and in alinement with the portion of the meter to be transferred to the film, a lamp in said casing, a shutter for the lens, and means common to the lamp and shutter for controlling them.

4. An apparatus for photographing the dial face of a metered service meter, which consists of a casing, spaced film reels therein, one of said reels receiving the film from the other, a tubular extension on the casing, said extension being open at one end and adapted to telescope over the meter face, means carried by the casing wall to engage the meter and limit the telescoping movement of the parts, a photographing lens in said extension and in alinement with the portion of the meter to be transferred to the film, a lamp in said casing, a shutter for the lens, and means common to the lamp and shutter for controlling them, one in advance of the other.

5. An apparatus for photographing the dial face of a metered service meter which consists of a casing, spaced film reels therein, one of said reels receiving the film from the other, a tubular extension on the casing, said extension being open at one end and adapted to telescope over the meter, a photographing lens in said extension in alinement with the portion of the meter to be transferred to the film, a lamp in the casing, a shutter for the lens, a plunger for controlling the shutter, and means common to the lamp and said plunger for controlling them one in advance of the other, the last said means embodying spaced contacts, one of the contacts being disposed adjacent but spaced from the plunger, and means for bringing said contacts together to light the lamp and subsequently move one of the contacts into engagement with said plunger to operate the latter.

6. An apparatus for photographing the dial face of a metered service meter which consists of a casing, a tubular extension on the casing and open at one end and adapted to telescope over the meter face and assist in supporting the apparatus, a lamp in the casing, a photographing lens also in the casing in alinement with the portion of the meter to be reproduced, means for holding a film in the active area of said lens, a shutter for the lens, and means for controlling the lamp and shutter.

7. An apparatus for photographing the dial face of a metered service meter which consists of a casing, a tubular extension on the casing and open at one end and adapted to telescope over the meter face and assist in supporting the apparatus, a lamp in the casing, a photographing lens also in the casing in alinement with the portion of the meter to be reproduced, means for holding a film in the active area of said lens, a shutter for the lens, and means common to the lens and lamp for controlling them.

8. An apparatus for photographing the dial face of a metered service meter which consists of a casing, a tubular extension on the casing and open at one end and adapted to telescope over the meter face, means within said casing to engage the meter for assisting in positioning the casing, a lamp in the casing, a photographing lens also in the casing in alinement with the portion of the meter to be reproduced, means for feeding a film across the active field of the lens, a shutter for controlling the lens, and means for controlling the lamp and said shutter.

9. An apparatus for photographing the dial face of a metered service meter which consists of a casing, a tubular extension on the casing and open at one end and adapted to telescope over the meter face, a shoulder within and spaced from the end of said casing for abutting the meter to position the casing, a lamp in the casing, a photographing lens also in the casing in alinement with the portion of the meter to be reproduced, means for holding a film in the active area of said lens, a shutter for the lens, and means common to the lens and lamp for controlling them one in advance of the other.

10. An apparatus for photographing the dial face of a metered service meter, comprising a casing tapered from the rear to the front, the front of the casing being open, a portion of the open end adapted to telescope with the meter, a photographic lens within the casing in alignment with the portion of the meter to be transferred to the film, lamps supported by the rear wall of the casing and on opposite sides of the lens, a shutter for the lens, means for controlling the lamps and the shutter, a shoulder formed in the casing and spaced from the open end, to limit the telescoping movements of the casing with the meter, and means for directing the film into position with respect to said lens.

11. An apparatus for photographing the dial face of a metered service meter, comprising a casing tapered from the rear to the front, the front of the casing being open, a photographic lens within the casing in alignment with the portion of the meter to be transferred to the film, lamps supported by the rear wall of the casing and on opposite sides of the lens, a shutter for the lens, means for controlling the lamps and shutter, a shoulder formed in the casing and spaced from the open end to limit the telescoping movement of the casing with the meter, a reel casing supported by the first said casing in alignment with said lens, and film reels in the reel casing, one of the reels receiving the film from the other reel.

EMERY H. FAHRNEY.